(12) United States Patent
Birkelund

(10) Patent No.: US 8,434,734 B2
(45) Date of Patent: May 7, 2013

(54) ELECTROMAGNETIC ACTUATOR AND VALVE

(75) Inventor: Michael Birkelund, Middelfart (DK)

(73) Assignee: Danfoss A/S, Nordborg (DK)

( * ) Notice: Subject to any disclaimer, the term of this patent is extended or adjusted under 35 U.S.C. 154(b) by 279 days.

(21) Appl. No.: 12/918,366

(22) PCT Filed: Feb. 26, 2009

(86) PCT No.: PCT/DK2009/000053
§ 371 (c)(1),
(2), (4) Date: Aug. 19, 2010

(87) PCT Pub. No.: WO2009/106080
PCT Pub. Date: Sep. 3, 2009

(65) Prior Publication Data
US 2010/0327202 A1    Dec. 30, 2010

(30) Foreign Application Priority Data

Feb. 28, 2008 (DE) .......................... 10 2008 011 573

(51) Int. Cl.
*F16K 31/10* (2006.01)
(52) U.S. Cl.
USPC ....... 251/129.15; 251/122; 335/265; 335/259
(58) Field of Classification Search .......... 251/120–123, 251/129.15; 335/265, 259
See application file for complete search history.

(56) References Cited

U.S. PATENT DOCUMENTS

| | | | | |
|---|---|---|---|---|
| 1,817,592 A | * | 8/1931 | Sokoloff | 335/259 |
| 2,888,237 A | * | 5/1959 | Dahl | 251/120 |
| 2,901,210 A | * | 8/1959 | Hebard | 251/129.1 |
| 3,961,298 A | | 6/1976 | Jaffe et al. | |
| 4,546,955 A | * | 10/1985 | Beyer et al. | 251/129.15 |
| 4,812,884 A | | 3/1989 | Mohler | |
| 4,815,497 A | * | 3/1989 | Pick | 137/883 |
| 4,936,543 A | * | 6/1990 | Kamibayasi | 251/129.15 |
| 5,422,617 A | | 6/1995 | Brown | |
| 5,836,001 A | * | 11/1998 | Hielkman et al. | 335/259 |
| 5,971,356 A | | 10/1999 | Offenwanger et al. | |
| 5,992,822 A | * | 11/1999 | Nakao et al. | 251/129.15 |
| 6,047,718 A | * | 4/2000 | Konsky et al. | 137/1 |
| 6,050,542 A | * | 4/2000 | Johnson et al. | 251/129.15 |

(Continued)

FOREIGN PATENT DOCUMENTS

| | | |
|---|---|---|
| CH | 184977 A | 6/1936 |
| DE | 548390 C | 4/1932 |

(Continued)

OTHER PUBLICATIONS

International Search Report from corresponding International Application No. PCT/DK2009/000053 dated May 28, 2009 (3 pages).

*Primary Examiner* — John Rivell
*Assistant Examiner* — Minh Le
(74) *Attorney, Agent, or Firm* — McCormick, Paulding & Huber LLP

(57) ABSTRACT

The invention concerns an electromagnetic actuator (7) with a coil (8) and at least two armatures (12, 17) being movable along an axis (16) and being acted upon by a magnetic field generated by the coil (8). It is endeavoured to achieve large control opportunities by simple means. For this purpose, it is provided that one armature (12) is acted upon by a larger drive force from the magnetic field than another armature (17).

12 Claims, 4 Drawing Sheets

U.S. PATENT DOCUMENTS

| | | |
|---|---|---|
| 6,719,265 B2 | 4/2004 | Kloda et al. |
| 6,814,339 B2 | 11/2004 | Berger et al. |
| 6,955,186 B2 * | 10/2005 | Kill et al. ............... 137/596.17 |
| 6,989,729 B2 | 1/2006 | Mayr et al. |
| 7,199,687 B2 * | 4/2007 | Maruhashi et al. ........... 335/131 |
| 7,347,221 B2 * | 3/2008 | Berger et al. ................ 137/628 |
| 7,766,037 B2 * | 8/2010 | Moenkhaus et al. ....... 137/556.3 |
| 2010/0037956 A1 * | 2/2010 | Scudamore et al. ............ 137/1 |
| 2010/0059697 A1 * | 3/2010 | Frank et al. .............. 251/129.15 |
| 2010/0282326 A1 * | 11/2010 | Zhu et al. ........................ 137/1 |

FOREIGN PATENT DOCUMENTS

| | | |
|---|---|---|
| DE | 1650534 A1 | 9/1970 |
| DE | 10255414 A1 | 6/2004 |
| EP | 0025382 A1 | 3/1981 |
| EP | 0296983 A1 | 12/1988 |
| EP | 0763683 A1 | 3/1997 |
| EP | 1288481 A2 | 3/2003 |
| FR | 2834378 A1 | 7/2003 |

* cited by examiner

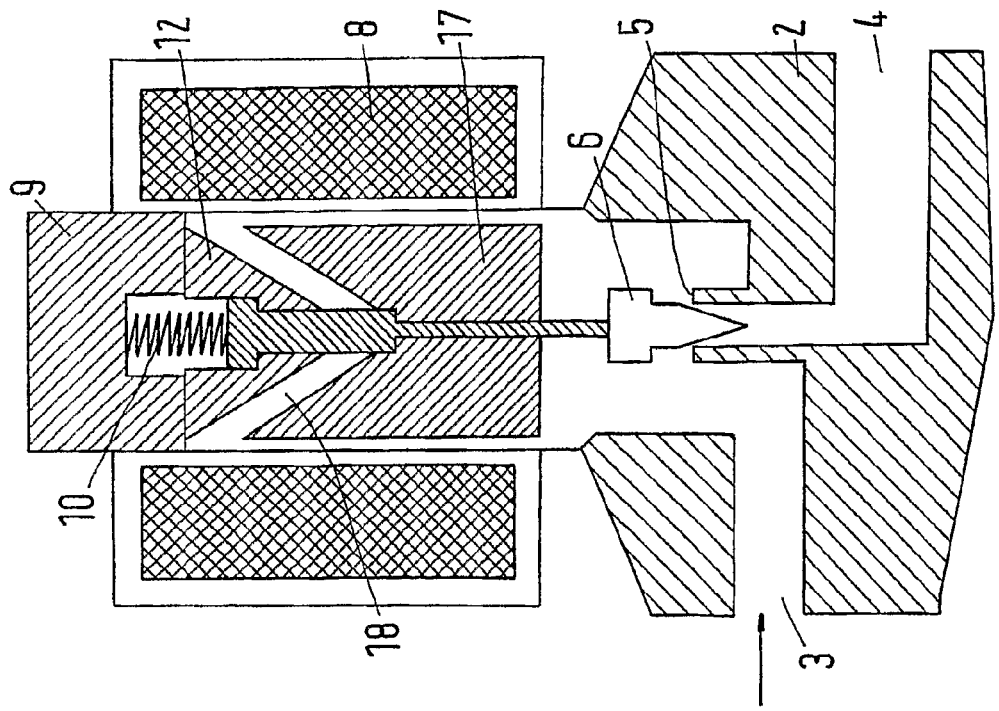
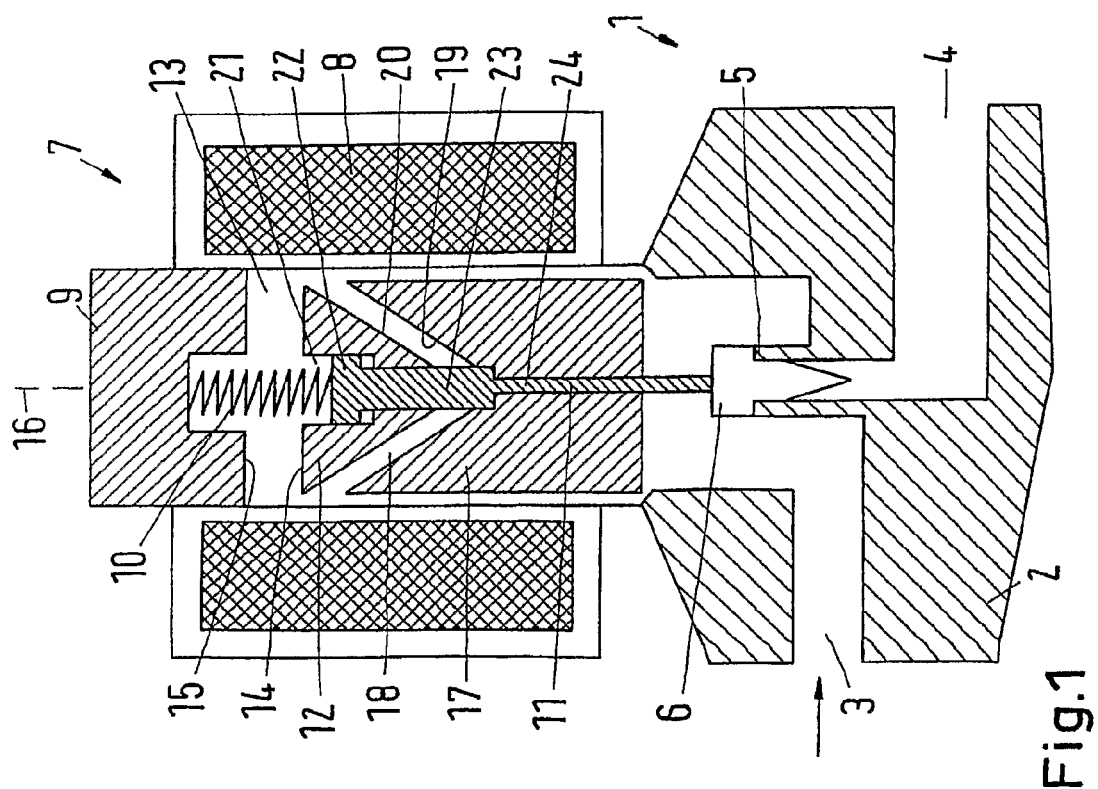

ELECTROMAGNETIC ACTUATOR AND VALVE

CROSS REFERENCE TO RELATED APPLICATIONS

This application is entitled to the benefit of and incorporates by reference essential subject matter disclosed in International Patent Application No. PCT/DK2009/000053 filed on Feb. 26, 2009 and German Patent Application No. DE 10 2008 011 573.8 filed Feb. 28, 2008.

FIELD OF THE INVENTION

The invention concerns an electromagnetic actuator with a coil and at least two armatures being movable along an axis and being acted upon by a magnetic field generated by the coil.

Further, the invention concerns a valve with an inlet, an outlet and, between them, a valve seat that interacts with a valve element.

BACKGROUND OF THE INVENTION

Such an electromagnetic actuator and a valve are, for example, known from EP 0 763 683 A1. Inside the coil are arranged two armatures, which can move along the central axis of the coil, when the coil is acted upon by a current and accordingly generates a magnetic field. The magnetic field causes that the two armatures attract each other mutually. In this connection, one armature removes itself from an actuation shaft of a valve element, thus releasing a pressure balancing opening. By means of a spacer, the other armature is connected to the actuation shaft. The actuation shaft is connected to the valve element. As soon as the pressure balancing over the valve element has taken place, the force of a spring is sufficient to open the valve further.

U.S. Pat. No. 6,814,339 B2 discloses a solenoid valve comprising two magnetic circuits, each comprising a coil and an armature. The two coils can be controlled independently of each other, so that two valve elements can be controlled to release a valve opening more or less extensively. In fact, this provides extended control opportunities. However, the effort to be invested in the manufacturing is relatively high.

SUMMARY OF THE INVENTION

The invention is based on the task of providing extensive control opportunities with simple means.

With an electromagnetic actuator as mentioned in the introduction, this task is solved in that one armature is acted upon by a larger drive force from the magnetic field than another armature.

With this embodiment, the armature that is acted upon by a larger drive force from the magnetic field will move earlier or faster than the other armature. These different movements can be used for a plurality of applications, for example for the actuation of a valve.

Preferably, a transmitting element is provided to be driven by any of the movable armatures. By means of the transmitting element, the drive effect caused by the magnetic field can be transmitted to the outside. As the transmitting element can be driven by any of the armatures, it is ensured that the effect of the magnetic field on each armature can be transmitted to the outside, so that the stronger or the weaker force can be used to control a control element connected to the transmitting element.

It is preferred that each movable armature only acts upon the transmitting element in one movement direction. In the other movement direction, for example, a reset device, for example in the form of a return spring, can act upon the transmitting element. The limitation to one movement direction can, for example, be caused by selecting a corresponding geometry.

In a preferred embodiment, it is provided that a connecting element is arranged between the two movable armatures, said connecting element having, in relation to at least one movable armature, a reduced movability in the pulling direction and in the pressure direction. Also with such a connecting element a movement can then be controlled so that first one movable armature is moved and then the second movable armature is moved. The transmission of the movement to the outside can then take place through one of the two movable armatures.

Preferably, a stationary armature is provided. Such a stationary armature can also be called a "yoke". The actuator then has at least three armatures. Thus, the forces acting upon the movable armatures can be even better controlled.

It is preferred that the movable armatures are arranged on one side of the stationary armature. The transmitting element preferably acts out of the stack of armatures on the side facing away from the stationary armature.

In a particularly preferred embodiment, it is provided that air gaps are provided between the armatures, the geometries of said air gaps being different from each other. The use of differently designed air gaps is a simple way of permitting differently large magnetic forces to act upon the movable armatures. These different forces then result in different movements.

Preferably, one air gap has armature-side bordering surfaces being more inclined in relation to the axis than armature-side bordering surfaces of another air gap. Figuratively speaking, the magnetic field searches the path having the smallest resistance. Thus, the magnetic field will search the shortest possible air gap path and accordingly leave or enter the bordering surfaces in a practically perpendicular manner. The different inclinations of the bordering surfaces in relation to the axis cause different directions of the magnetic field. As only components of the magnetic field can generate forces parallel to the axis in the movement direction, this is a simple way of generating different force influences on the armatures.

It is preferred that an air gap has armature-side bordering surfaces extending perpendicularly to the axis. In this air gap mainly components of the magnetic field occur, which are directed in parallel to the axis, accordingly acting with the largest forces upon the movable armature bordering this air gap.

It is also preferred that an air gap has armature-side bordering surfaces having, at least in sections, the shape of a cone sleeve. In the air gap the magnetic field and the axis enclose a smaller or larger angle, so that components extending in parallel to the axis are weaker.

Preferably, the magnetic flux through the air gaps is the same. This does not mean that they have to be equal in the mathematical sense of the word. Inside the axial extension of the coil, the flux is regarded as "equal". Accordingly, a coil and a magnetic circuit with a relatively simple embodiment can be used.

Preferably, the drive force on one armature is 30 to 70% larger than on another armature. The armature with the larger drive force will then move clearly ahead of the other armature, which can be utilised for the control of a device driven by the electromagnetic actuator.

With a valve as mentioned in the introduction, the task is solved in that the valve element is connected to an actuator as described above.

The actuator can lift the valve element off from the valve seat or return it to the valve seat. In this connection, a multi-stage drive can be realised, even though only one coil is provided. The various movement stages of the valve element can easily be set by means of currents having different intensities being supplied to the coil.

It is particularly preferred that the movable armature acted upon by the larger forces works as an on/off controller and the movable armature acted upon by the smaller forces works as a proportional controller. In a valve, the force required for the initial opening of the valve is often much larger than the force required to move the valve element, when the valve is open. In an advantageous manner, the described concept can now be used so that the armature acted upon by the larger forces is used to lift the valve element off from the valve seat. In this state, approximately the same forces will act upon the valve element in both movement directions. Then, the armature acted upon by the smaller forces can be used to adjust the exact position of the valve element in relation to the valve seat, and thus the opening degree and the flow through the valve.

Preferably, a closing spring acts upon the valve element via the transmitting element, and the magnetic field generates forces acting in the opening direction. When current is applied to the coil, both armatures are acted upon by forces in the opening direction. When the current is turned off, the closing spring causes the valve element to be pressed against the valve seat again.

Preferably, the valve element is arranged between the inlet and the valve seat. The pressure in the inlet then additionally acts upon the valve element in the closing direction. This causes that larger forces are required to lift the valve element off from the valve seat. Due to the embodiment with the armatures acted upon by differently large forces, however, this is uncritical.

In the following, the invention is described on the basis of a preferred embodiment in connection with the drawings, showing:

BRIEF DESCRIPTION OF THE DRAWINGS

FIG. 1 is a schematic view of a valve with a actuator, the valve being closed,

FIG. 2 is a view according to FIG. 1 with the valve in as slightly opened position.

DETAILED DESCRIPTION OF THE PREFERRED EMBODIMENT

Figure 4:
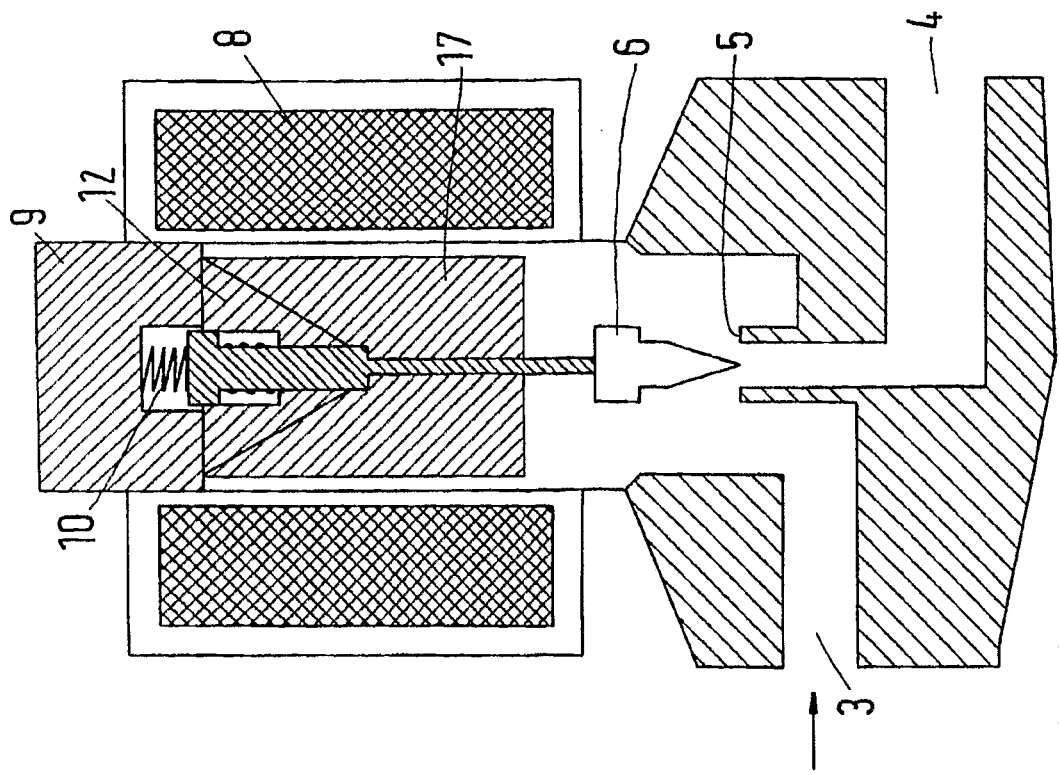
FIG. 4 is a view according to FIG. 1 with the valve in the largest possible opening position.
Figure 3:
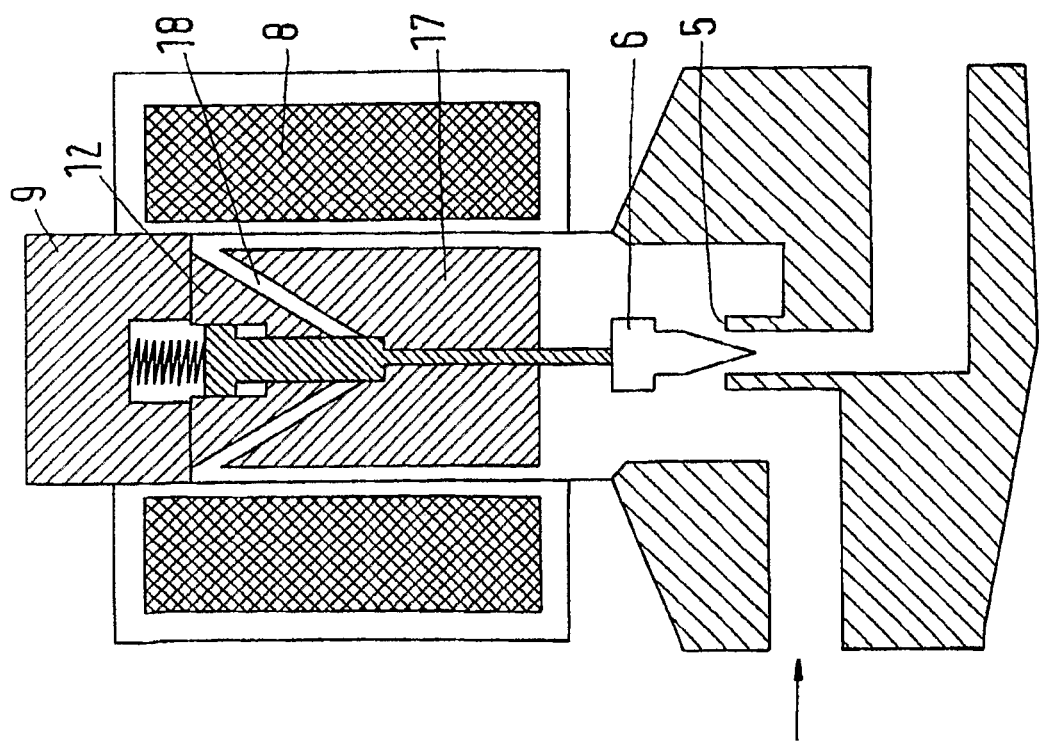
FIG. 3 is a view according to FIG. 1 with the valve in a further opened position.

FIG. 1 is a schematic view of a valve 1 with a valve housing 2 comprising an inlet 3, an outlet 4 and a valve seat 5 there between. When the valve 1 is closed, a valve element 6 rests on the valve seat 5. When the valve is open, the valve element 6 is lifted more or less off from the valve seat 5 (FIGS. 2 to 4).

For the actuation of the valve element 6, an electromagnetic actuator 7 is provided, which is connected to the valve housing 2.

The actuator 7 comprises one single coil 8 that can be supplied with current in a manner not shown in detail, the intensity of this current being adjustable. By means of the intensity of the current, also the intensity of a magnetic field and thus the intensity of the magnetic flux generated by the coil 8 can be adjusted.

On a front end of the coil 8 an stationary armature 9 that can also be called a "yoke" is arranged. The armature 9 serves as counter flange for a closing spring 10 that acts upon a transmission element 11 that is connected to the valve element 6. This means that the closing spring 10 loads the valve element 6 in the direction of the valve seat 5.

Inside the coil 8 is provided a first movable armature 12 that forms an air gap 13 with the stationary armature 9. The air gap 13 is bordered by armature-side bordering surfaces 14, 15, which are directed perpendicularly to an axis 16 of the coil 8.

A second movable armature 17 forms a second air gap 18 with the first movable armature 12, the armature-side bordering surfaces 19, 20 of said air gap 18 having the form of cone sleeve surfaces, that is, together with the axis 16 of the coil 8, the bordering surfaces 19, 20 form an acute angle.

The first armature 12 has a stepped bore 21 through which the transmission element 11 is guided. In this connection, the transmission element 11 has a first section 22, whose diameter corresponds to the largest diameter of the stepped bore 21. Further, the transmission element has a second section 23, whose diameter corresponds to the smallest diameter of the stepped bore 21. Consequently, during a movement of the first armature 12 in the direction of the stationary armature 9 the transmission element 11 is pulled along in the direction of the armature 9. On the other hand, the transmission element 11 can also move further in the direction of the stationary armature 9 without being driven by the first movable aramature 12, for example under the control of the second movable armature 17.

The transmission element 11 has a third section 24 that is guided through the second movable armature 17. The third section 24 has a smaller diameter than the second section 23. Accordingly, the second section 23 rests with a step on the second movable armature 17. When the second movable armature 17 is moved in the direction of the stationary armature 9, it pulls the transmission element 11 along. However, the transmission element 11 can also move in the direction of the stationary armature 9 without requiring a movement by the second movable armature 17.

The two air gaps 13, 18 are arranged inside the coil 8, so that substantially the same magnetix flux rules in both air gaps.

Due to the different shapes of the air gaps 13, 18, however, different main directions of the magnetic field or the magnetic flux occur in the air gaps. In the first air gap 13, the magnetic field is substantially directed in parallel to the axis 16, that is, the field lines extend in parallel to the axis 16. In the second air gap 18, the field lines extend perpendicularly to the bordering surfaces 19, 20, that is, the magnetic field and thus also the magnetic flux are directed in an acute angle in relation to the axis 16. With the same magnetic flux as in the air gap 13, this causes a weaker component of the magnetic flux in parallel to the axis 16, so that also the forces caused by this, which act between the first movable armature 12 and the second movable armature 17, are smaller than the forces between the first movable armature 12 and the yoke.

If the coil 8 is supplied with current and a magnetic field occurs, as shown in FIG. 2, the first movable armature 12 is pulled towards the yoke 9 under reduction of the first air gap 13. This compresses the closing spring, and the valve element 6 is lifted off from the valve seat 5. This causes a pressure balancing across both sides of the valve element 6, so that the pressure in the inlet 3 does not more acts in a closing manner upon the valve element 6.

As magnetic forces also act in the second air gap 18, the second movable armature 17 has followed the first movable armature 12. However, with the current intensities generated by the configuration shown in FIG. 2, it will not come to rest on the first movable armature 12.

When the current intensity is further increased, a situation as shown in FIG. 3 occurs. Here, the second movable armature 17 is approached even further to the first movable armature 12 under a reduction of the second air gap 18, so that the valve element 6 will have an even further distance to the valve seat 5 as in the situation shown in FIG. 2.

When the current intensity in the coil 8 is further increased, the second movable armature 17 will come to rest on the first movable armature 12, so that also the second air gap 18 disappears. In this situation, the valve element 6 has its largest possible distance to the valve seat 5, so that the passage between the inlet 3 and the outlet 4 is opened as much as possible.

When the current through the coil 8 is turned off, the closing spring 10 ensures that the valve element 6 is brought to rest on the valve seat 5 again.

Now, the actuator 7 can be driven so that the movement of the first movable armature 12 occurs as an on/off movement, that is, the first armature 12 merely ensures an opening and closing of the valve 1. For this purpose, the current intensity is adjusted by the coil 8, so that the attraction forces acting over the first air gap 13 between the yoke 9 and the first movable armature 12 are large enough to lift the valve element 6 off from the valve seat 5. However, they are not so large that also the second armature 17 moves to a mentionable extent in relation to the first armature 12.

However, the movable armature 17 can be controlled by the current flowing in the coil 8 in such a manner that a proportional control of the opening of the valve 1 is possible.

Figure 5:
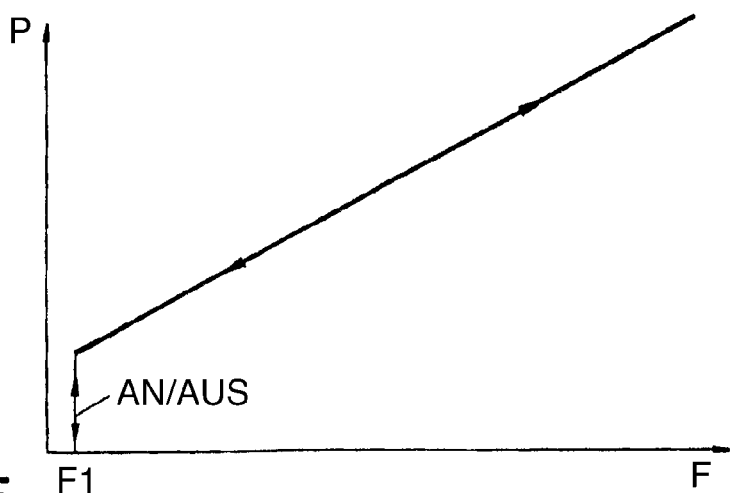
FIG. 5 is a view of the movement of the valve element across the magnetic flux at smaller forces.

FIG. 5 shows in the upward direction the position P of the valve element 6 in relation to the valve seat 5 and to the right the magnetic flux F that is generated by the current flowing in the coil 8. A flux F1 results in the actuation of the first movable armature 12, that is, an "on/off" movement that lifts the valve element 6 off from the valve seat 5. In a section, where the magnetic flux F is larger than F1, the size of the magnetic flux F can permit a substantially proportional control of the position P of the valve element 6 in relation to the valve seat 5.

Figure 6:
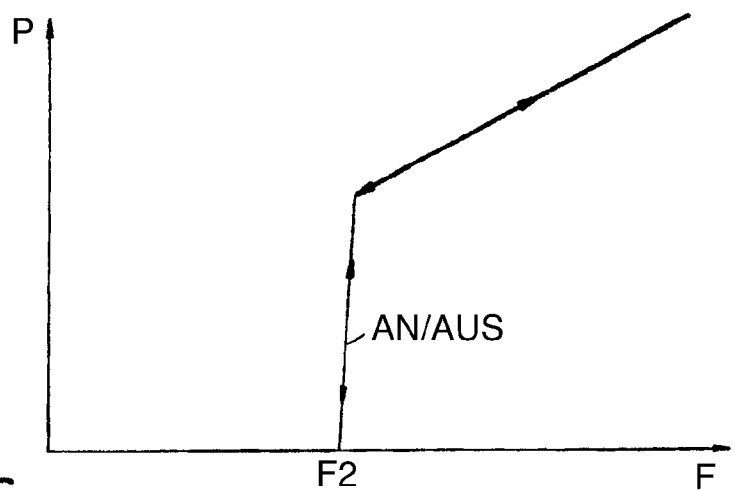
FIG. 6 is a view of the movement of the valve element across the magnetic flux at larger forces.

FIG. 6 shows a similar embodiment, in which, however, the forces acting upon the valve element 6 are so large that the opening movement only starts at a magnetic flux F2, here, however, also as an "on/off" movement. In a section exceeding F2, a proportional control then occurs.

The different forces acting upon the valve element 6 can be generated by selecting different strengths of the closing spring 10. A substantial influence also comes from the pressure difference between the inlet 3 and the outlet 4 acting upon the valve element 6 in the closing direction when the valve 1 is closed.

Figure 7:
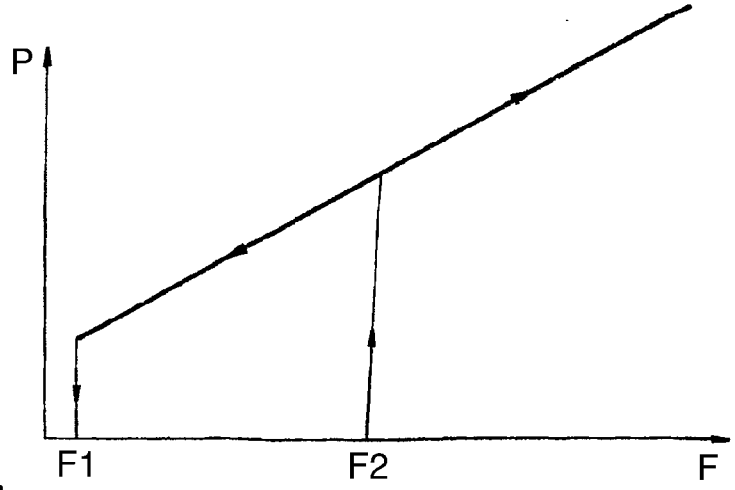
FIG. 7 is a schematic view explaining the movement of the valve element in a valve.

This results in a situation as shown in FIG. 7. The coil firstly has to generate a magnetic flux F2 to be able to open the valve, that is, to lift the valve element 6 off from the valve seat 5. As soon as the valve is open, a proportional adjustment of the position P of the valve element 6 can take place in an area, in which the flux is larger than F1. When the flux drops below F1, the valve 1 is closed again.

Deviations from the embodiment shown are possible in many aspects. The bordering surfaces 14, 15 must not necessary be plane. It is sufficient, when they enclose a larger cone angle with the axis 16.

The person skilled in the art will dimension the size of the air gaps 13, 18 in dependence of the desired forces.

The two air gaps 13, 18 must not have the same orientation over their complete axial extension. Thus, for example, the second air gap 18 can be made with several different cone sections.

It is also possible to reverse the cone of the second air gap 18, that is, to make it open in the direction of the valve element 6.

Further, a "double cone" can be provided, so that the front side of the second movable armature 17 that faces the first movable armature 12 is provided with a V-shaped groove, when the first movable armature 12 comprises a corresponding V-shaped projection geometry.

Under certain circumstances, the yoke, that is, the stationary armature 9, can be avoided, when it can be otherwise achieved that at a certain current influence the first armature 12 is moved away from the valve seat 5.

The forces acting upon the first movable armature 12 are 30% to 70%, for example 50%, larger than the forces acting upon the second movable armature 17. Thus, the first movable armature 12 can overcome the force of the closing spring 10 and the pressure difference over the valve element 6 earlier than the second armature 17, the first armature 12 thus resting on the yoke after a short movement. Here it remains until the valve 1 is closed. Thus, an increase of the current through the coil 8 will only influence the movement of the second armature 17.

Figure 8:
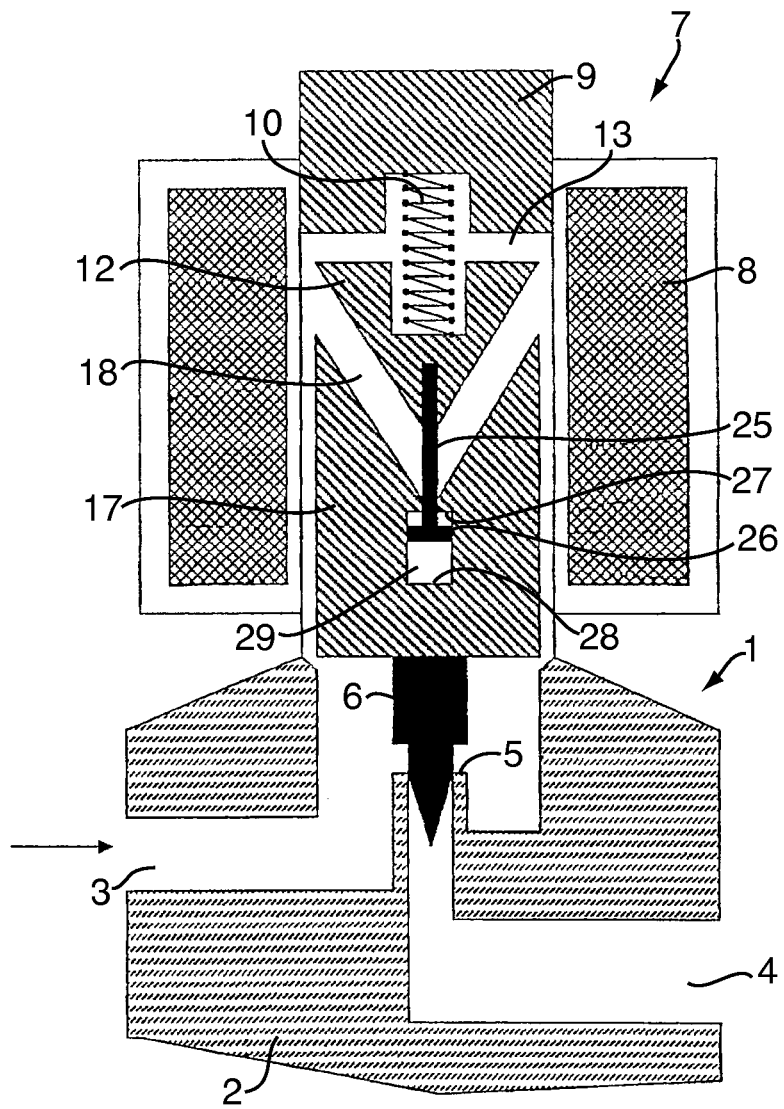
FIG. 8 is a modified embodiment.

FIG. 8 shows a valve 1 with a modified actuator 7. The same and functionally the same elements as in the FIGS. 1 to 4 are provided with the same reference numbers.

With the actuator according to FIG. 8, the valve element 6 is arranged directly at the second movable armature 17, that is, a movement of the second movable armature 17 is directly transmitted to the valve element 6.

The first movable armature 12 is connected to the second movable armature 17 via a connecting element 25. The connecting element 25 is fixed in the first movable armature 12. The connecting element 25 comprises a head 26 that is located in a recess 29 in the second movable armature 17. In the pulling direction the head 26 comes to rest on a first bearing surface 27, when the first movable armature 12 moves upwards, and on second bearing surface 28, when the first movable armature 12 moves downwards in relation to the second movable armature 17. The directional statements refer to the view in FIG. 8.

Accordingly, the connecting element 25 has a limited movability in relation to the second movable armature 17, said movability being limited by the two bearing surfaces 27, 28.

Of course, it is also possible to fix the connecting element 25 in the second movable armature and to permit the movability in relation to the first movable armature. Also imaginable is an embodiment, in which the connecting element 25 has a limited movability in relation to both movable armatures 12, 17.

Otherwise, the function of the actuator 7 is similar to the one described in connection with the FIGS. 1 to 4.

While the present invention has been illustrated and described with respect to a particular embodiment thereof, it should be appreciated by those of ordinary skill in the art that various modifications to this invention may be made without departing from the spirit and scope of the present.

What is claimed is:

1. A valve with an inlet, an outlet and, between them, a valve seat that interacts with a valve element, wherein the valve element is connected to an electromagnetic actuator with a single coil and at least two armatures being movable along an axis and being acted upon by a magnetic field generated by the coil, wherein one armature is acted upon by a larger drive force from the magnetic field than another armature, said valve further comprising:

a stationary armature serving as counter flange for a single closing spring acting upon a transmission element that is connected to the valve element, said closing spring loading the valve element in the direction of the valve seat, a first movable armature of the at least two armatures forming a first air gap with the stationary, armature, a second movable armature of the at least two armatures forming a second air gap with the first movable armature, and wherein, when said coil is supplied with current and a magnetic field occurs, drive force from the magnetic field pulls the first movable armature toward the stationary armature under reduction of the first air gap, and when the current intensity is further increased, the second movable armature is pulled toward the first movable armature under a reduction of the second air gap, and when the current through the coil is turned off, the closing spring ensures that the valve element is brought to rest on the valve seat.

2. The valve according to claim 1, wherein the movable armature acted upon by the larger forces works as an on/off controller and the movable armature acted upon by the smaller forces works as a proportional controller.

3. The valve according to claim 1, wherein the closing spring acts upon the valve element via the transmitting element, and the magnetic field generates forces acting in the opening direction.

4. The valve according to claim 1, wherein the valve element is arranged between the inlet and the valve seat.

5. The valve according to claim 1, wherein the transmitting element is provided to be driven by any of the movable armatures.

6. The valve according to claim 5, wherein each movable armature only acts upon the transmitting element in one movement direction.

7. The valve according to claim 1, wherein a connecting element is provided between the two movable armatures, said connecting element having a limited movability in the pulling and pushing directions in relation to at least one movable armature.

8. The valve according to claim 1, wherein the movable armatures are arranged on one side of the stationary armature.

9. The valve according to claim 1, wherein a magnetic flux through the air gaps is the same.

10. The valve according to claim 1, wherein the drive force on one armature is 30 to 70% larger than on another armature.

11. The valve according to claim 1, where said first air gap is bordered by armature-side bordering surfaces, which are directed perpendicularly to an axis of the coil.

12. The valve according to claim 1, where armature-side bordering surfaces of said second air gap have the shape of cone sleeve surfaces, said bordering surfaces, together with an axis of the coil, forming an acute angle.

* * * * *